Oct. 22, 1963

H. ULLI 3,108,179

BUFFER GAS WELDING INSTALLATION

Filed April 14, 1961

INVENTOR.

BY

United States Patent Office 3,108,179
Patented Oct. 22, 1963

3,108,179
BUFFER GAS WELDING INSTALLATION
Hans Ulli, Zurich, Switzerland, assignor to Oerlikon
Buhrle & Co., Zurich, Switzerland
Filed Apr. 14, 1961, Ser. No. 103,087
Claims priority, application Switzerland Apr. 22, 1960
3 Claims. (Cl. 219—130)

The present invention relates to a protective gas or buffer gas welding installation.

Protective gas welding installations are employed primarily for welding aluminum and alloys thereof and are used in connection with gas or electric arc welding. In view of the fact that aluminum and its alloys oxidize easily, it is customary to employ a protective or buffer gas in order to prevent the formation of an oxide layer at the welding portion.

Welding installations used for this purpose comprise a burner which receives the welding electrode, the cooling means and the protective gas control, and furthermore comprises an electrically operated feed unit. The welding electrode is usually fed by a generator, whereas the feeding unit receives its energy from a different current source. For feeding cooling fluid and discharging the same as well as for feeding and discharging the protective or buffer gas, further conduits are necessary. Heretofore, each of these conduits individually lead to the burner. When employing devices of this type, certain deficiencies were present. There deficiencies are seen for instance in that the handling and the feeding of the various hose and cable connections is cumbersome, and furthermore the hoses and electrical conductors frequently got entangled. Moreover, experience has shown that frequently breaks in the hoses and cables occurred near their connecting points.

It is, therefore, an object of the present invention to provide a protective or buffer gas welding installation which will overcome the above mentioned drawbacks.

It is another object of this invention to provide a protective gas welding installation which will improve the safety of operation thereof.

It is another object of this invention to provide a protective welding installation which will reduce the time for exchanging special tools to a minimum.

These and other objects and advantages of the invention will appear more clearly from the following specification in connection with the accompanying drawings in which.

Figure 1:
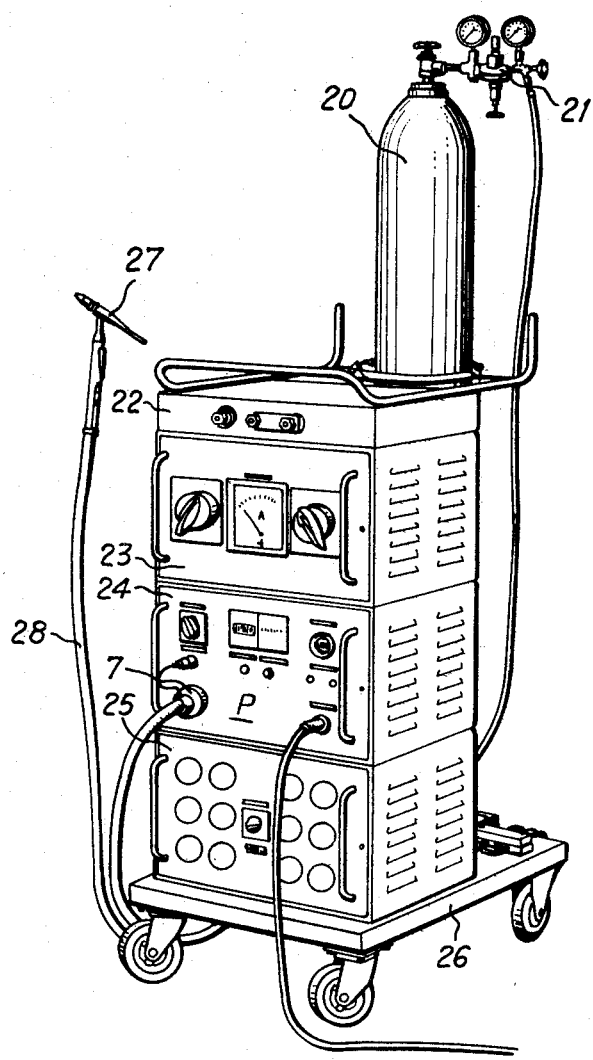
FIG. 1 is a perspective view of a protective gas or buffer gas welding installation according to the present invention.

The welding installation according to the present invention is characterized primarily in that the protective gas conduit, the conduit for the cooling fluid and the return conduit between the control apparatus and the burner are combined to a detachable plug unit.

More specifically, with reference to the drawings, the protective gas welding installation as shown therein comprises primarily a pressure gas cylinder 20 with pressure reducing valve 21 connected thereto. The welding installation furthermore comprises a box 22 with the welding resistance, a box 23 which contains the electric filter and condensers adapted to permit a proper and uniform welding of butt seams and also a saving of protective gas and an increase in the working speed. The box 24 contains the control apparatus with the switch elements necessary for controlling the welding operation. Finally, the box 25 comprises the hydraulic circuit cooling device which makes it possible to get by without direct connection to a water main. The entire group of boxes 22 to 25 is mounted on a movable wagon 26. The conduit for the protective gas, the cooling water supply and return conduit between the control apparatus and the burner 27 are combined to a single cable 28 which on the side of the control device ends in a detachable plug unit.

Figure 2:
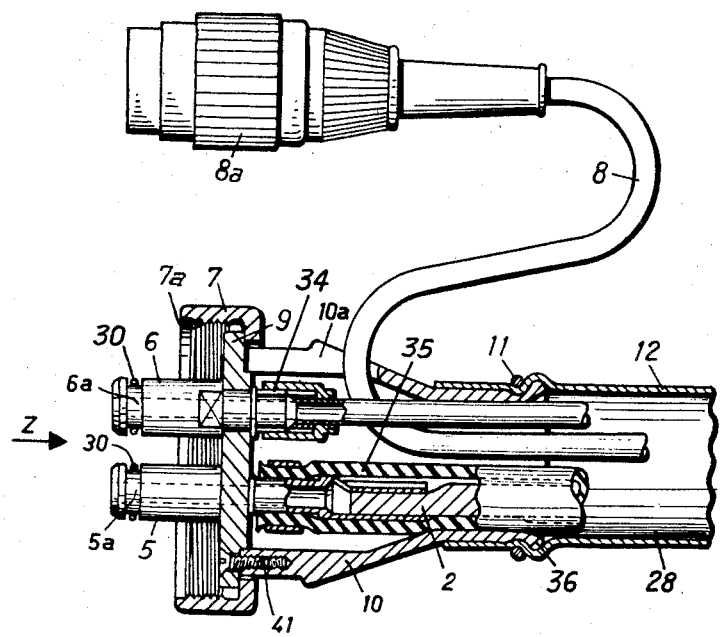
FIG. 2 shows a longitudinal section, partially in view, of a plug connection for use in connection with the present invention.
Figure 3:
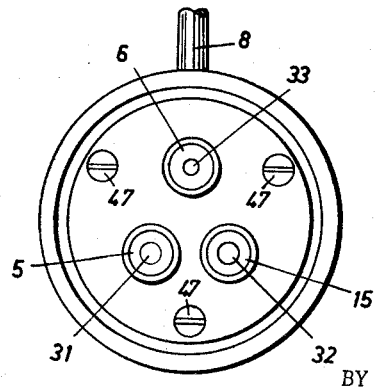
FIG. 3 is an end view of the plug connection of FIG. 2, as seen in the direction of the arrow 2.

As will be seen from FIGS. 2 and 3, three plug nipples 5, 6 and 15 extend through a flange 9 of a plug connection. The said nipples 5, 6 and 15 comprise a cylindrical portion and a stepped part which extends through flange 9. Nipple 5 is fixedly connected to flange 9, whereas nipples 6 and 15 are detachably connected to said flange 9. The cylindrical portion of the nipples 5 and 6 is near that end thereof which is remote from flange 9 provided with a groove 5a, 6a respectively for receiving sealing rings 30, preferably of rubber or synthetic material, such as phenolic resins e.g. phenol formaldehyde resin, or urea formaldehyde resin. The nipples 5, 6 and 15 have axial bores 31, 32, 33. The bore 33 of nipple 6 has a smaller diameter than that of the nipples 5 and 15. The rear end of nipple 6 is provided with a thread 34, whereas the rear ends of nipples 5 and 15 are tubular and are adapted to receive a hose 35.

Flange 9 has connected thereto a sleeve 10 by means of screws 47 (three being shown), flange 9 protruding radially beyond the adjacent ends of sleeve 10. Sleeve 10 has an opening 10a through which extends a cable 8 having connected thereto a plug 8a. Furthermore, near flange 9 sleeve 10 is provided with a cylindrical portion having turnably mounted thereon a box nut 7 provided with an internal thread 7a. Sleeve 10 also has a cone-shaped section the outer end of which is provided with an outwardly extending bead 36. A protective hose 12 has been slipped over bead 36 and is pressed against sleeve 10 by means of a ring 11 behind bead 36. The hose 12 is made of a flexible material, such as flexible thermoplastic resin e.g. poly ethylene, poly vinylchloride, synthetic elastomers, e.g. poly chloroprene, poly isobutylene, reinforced textile material or a flexible metal tube or combinations of these materials.

Figure 4:
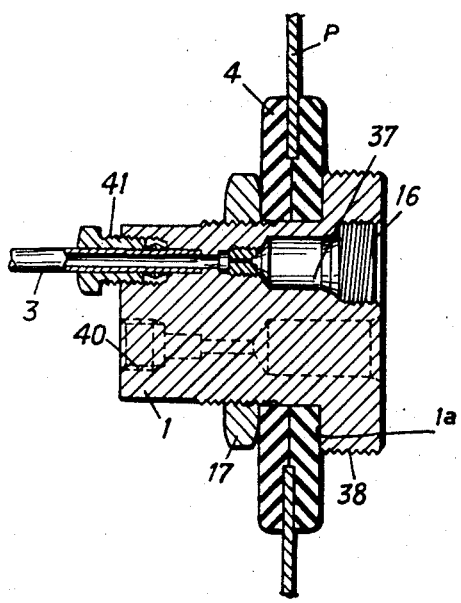
FIG. 4 is a coupling nut member for use in connection with the present invention.

The nipples 5, 6 and 15 are arranged in conformity with the corners of a triangle and are unevenly spaced from each other so that the plug connection may be plugged into a coupling socket 1 as shown in FIG. 4 without the possibility of placing plug portions into wrong socket portions. Furthermore, nipple 6 at the top is the gas connection so water can never drip into the gas line.

The coupling socket 1 has three bores 37 extending therethrough in axial direction and spaced from each other in conformity with the mutual spacing of the nipples 5, 6 and 15. The bores 37 are so dimensioned that the plug according to FIG. 2 may by means of nipples 5, 6 and 15 be plugged into the coupling socket 1. For arresting the plug, the thread 7a of the box nut 7 is screwed onto the outer thread on flange 38 of the coupling socket 1. The bores 37 have a narrow portion in approximately the central portion of the socket 1 and have their rear portions provided with a thread 40 into which threaded bushings or nipples 41 are screwed for connecting the conduits 3.

Figure 5:
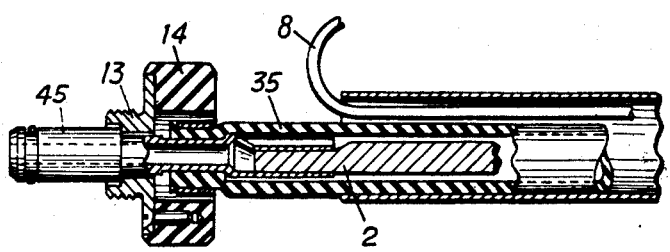
FIG. 5 represents a longitudinal section of a further modification of a plug connection according to the invention.

Bore 37 into which is passed to nipple 6 is likewise provided with a thread 16 in order also to allow the connection of such plugs with the coupling socket 1 which cannot be held by box nut 7, for instance a plug according to FIG. 5.

The cylindrical central portion of coupling plug 1 has mounted thereon two clamping discs 4 preferably of synthetic material, such as synthetic elastomers, e.g. poly chloroprene, synthetic polymers, e.g. poly tetrafluoroethylene etc. which by means of a threaded nut 17 are pressed against a shoulder 1a of the coupling plug 1. By means of these two clamping discs 4, the coupling plug 1 is clamped fast to the front plate P of the control device 24. That portion of coupling plug 1 which extends into the interior of the control box 24 is fixedly connected to the feeding lines or conduits, namely a gas conduit 3, a cooling fluid conduit and a cooling fluid return conduit. In addition thereto, the coupling plug 1 is equipped with an electric connection which in assembled condition of the two coupling parts is conductively connected to nipple 5.

The thus composed coupling plug 1 serves for receiving the plug according to FIG. 2 or according to FIG. 5. The plug according to FIG. 2 has three plug nipples. A protective gas conduit 3 is connected to the plug nipple 6. The tubular portion of nipple 15 has connected thereto a hose for the cooling water supply. Nipple 5 which is composed of a current conducting material is connected to a current feed line 2 leading to the burner and is furthermore surrounded by a cooling water return hose 35.

The plug according to FIG. 5 has one single plug nipple 45 only and serves for gas cooled burners for which no cooling fluid is necessary. The stepped thinner portion of nipple 45 extends through a closure screw 13 which is provided with a thread and which is connected to a ring 14 of insulating material. The thinner portion of nipple 45 likewise serves for receiving the current supply line 2 leading to the electrode and also serves for connecting the hose.

With the plug unit according to FIG. 2, the cooling water passes through the plug nipple 15 to the electrode and from there after a cooling has been effected flows back through hose 35 and nipple 5. During its return flow, the water also cools the current supply line 2. It is, however, also possible to cool the current supply line by means of the protective or buffer gas as is the case with the plug connection according to FIG. 5. Cable 8 which by means of plug 8a is likewise connected to the control device, supplies electric energy to a feed cylinder of the electrode.

As will be evident from the above, the protective gas welding installation according to the present invention has the advantage that due to the plug connection, the entire hose packet length can actually be used so that due to the fact that the individual conduits lead to a common protective hose, the safety of operation of the installation has been greatly increased.

Furthermore, a connection of a special cable connecting element becomes superfluous. The exchange of the welding burner units requires merely a minimum of time and may be effective without special tools in the shortest time.

The conduits for gas and water cannot be mistaken so that gas or water cooled welding burners may be connected to the same device without the necessity of carrying out alterations.

The plug unit according to the present invention assures a proper and safe mounting of the stable hose and cable arrangement whereby hose and cable breaks near the connecting elements may be obviated.

It is, of course, to be understood that the present invention is, by no means, limited to the particular constructions shown in the drawings and the field of employments mentioned but also comprises any modifications within the scope of the appended claims. Thus, plug connections of the principle described above may also be employed with flame welding machines or installations in which instance the number of the plug nipples might be increased.

What I claim is:

1. In a protective gas welding installation; a burner, unitary flexible conduit means leading from the burner having flexible conduits therein for respectively conveying a protective gas to said burner and for conveying and returning cooling fluid to and from said burner, electric conductors also in said conduit means for supplying current to the burner, a plug member on the end of said conduit means opposite said burner, said conduits leading to said plug member, said plug member comprising individual hollow tubular nipples connected with said conduits and projecting from the plug member for detachable plug-in connection to a receptacle, a wall element, a receptacle fixed on said wall element to receive said plug member having horizontal tubular recesses to receive said nipples, said nipples and recesses being unevenly spaced so as to be engageable in only one relative rotated positoin of said plug member and receptacle, and the nipple for the gas being located above the nipples for fluid.

2. In a protective gas welding installation; a burner, unitary flexible conduit means leading from the burner having flexible conduits therein for respectively conveying a protective gas to said burner and for conveying and returning cooling fluid to and from said burner, a plug member on the end of said conduit means opposite said burner, said conduits leading to said plug member, and said plug member comprising individual tubular nipples connected with said conduits and projecting from the plug member for plug-in connection to a receptacle, a wall element, a receptacle fixed on said wall element to receive said plug member having horizontal tubular recesses to receive said nipples, said nipples and recesses being unevenly spaced so as to be engageable in only one relative rotated position of said plug member and receptacle, and the nipple for the gas being located above the nipples for fluid, said nipples being annularly grooved, and resilient seal rings in said grooves for sealing engagement with a receptacle.

3. An arrangement according to claim 1 in which said wall element is the wall of a control unit, one of said receptacle and plug members being externally threaded and the other having a nut rotatably supported thereon which is complementarily internally threaded for securing the plug member and receptacle together.

References Cited in the file of this patent
UNITED STATES PATENTS

| | | |
|---|---|---|
| 455,021 | Krehbiel | June 30, 1891 |
| 2,291,071 | Bruno | July 28, 1942 |
| 2,798,145 | Vogel | July 2, 1957 |
| 2,836,705 | Cotter | May 27, 1958 |
| 2,890,322 | Oyler et al. | June 9, 1959 |